(12) United States Patent
Zehavi et al.

(10) Patent No.: US 10,960,605 B2
(45) Date of Patent: Mar. 30, 2021

(54) SELECTIVE POWDER DELIVERY FOR ADDITIVE MANUFACTURING

(71) Applicant: Applied Materials, Inc., Santa Clara, CA (US)

(72) Inventors: Raanan Zehavi, Sunnyvale, CA (US); Hou T. Ng, Campbell, CA (US); Nag B. Patibandla, Pleasanton, CA (US); Eric Ng, Mountain View, CA (US); Ajey M. Joshi, San Jose, CA (US); Kashif Maqsood, San Francisco, CA (US); Paul J. Steffas, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 290 days.

(21) Appl. No.: 16/155,460

(22) Filed: Oct. 9, 2018

(65) Prior Publication Data
US 2019/0105837 A1    Apr. 11, 2019

Related U.S. Application Data

(60) Provisional application No. 62/570,593, filed on Oct. 10, 2017.

(51) Int. Cl.
*B29C 64/329*    (2017.01)
*B29C 64/153*    (2017.01)
(Continued)

(52) U.S. Cl.
CPC .......... *B29C 64/329* (2017.08); *B22F 3/1055* (2013.01); *B29C 64/153* (2017.08);
(Continued)

(58) Field of Classification Search
None
See application file for complete search history.

(56) References Cited

U.S. PATENT DOCUMENTS

| 5,188,262 A | 2/1993 | Fielding |
| 6,641,778 B2 | 11/2003 | McGregor |

(Continued)

FOREIGN PATENT DOCUMENTS

| KR | 10-2016-0024197 | 3/2016 |
| KR | 10-2016-0046642 | 4/2016 |

OTHER PUBLICATIONS

International Search Report and Written Opinion in International Application No. PCT/US2018/055060, dated Feb. 12, 2019, 13 pages.

*Primary Examiner* — Mary Lynn F Theisen
(74) *Attorney, Agent, or Firm* — Fish & Richardson P.C.

(57) ABSTRACT

A dispensing system for an additive manufacturing includes a powder source that contains powder to form an object, and an array of nozzles positioned at a base of the powder source over a top surface of a platen where the object is to be formed. The powder flows from the powder source through the nozzles to the top surface. A respective powder wheel in each nozzle controls a flow rate of the powder. Each wheel has multiple troughs on surface of the wheel. When a motor rotates the wheel, the troughs transport the powder through the nozzle. The rotation speed of the wheel controls the flow rate. For solid parts of the object, the wheel rotates and allows the powder to be deposited on the top surface. For empty parts of the object, the wheel remains stationary to prevent the powder from flowing to the surface.

20 Claims, 12 Drawing Sheets

(51) Int. Cl.

| | |
|---|---|
| *B29C 64/209* | (2017.01) |
| *B22F 3/105* | (2006.01) |
| *B33Y 10/00* | (2015.01) |
| *B33Y 30/00* | (2015.01) |
| *B29C 64/343* | (2017.01) |
| *B29C 64/336* | (2017.01) |
| *B29C 64/371* | (2017.01) |
| *B33Y 40/00* | (2020.01) |
| *B29C 64/245* | (2017.01) |
| *B29C 64/393* | (2017.01) |
| *B33Y 50/02* | (2015.01) |
| *B33Y 70/00* | (2020.01) |
| *B29K 71/00* | (2006.01) |

(52) U.S. Cl.
CPC .......... *B29C 64/209* (2017.08); *B29C 64/245* (2017.08); *B29C 64/336* (2017.08); *B29C 64/343* (2017.08); *B29C 64/371* (2017.08); *B29C 64/393* (2017.08); *B33Y 10/00* (2014.12); *B33Y 30/00* (2014.12); *B33Y 50/02* (2014.12); *B22F 2003/1057* (2013.01); *B22F 2003/1058* (2013.01); *B29K 2071/00* (2013.01); *B33Y 40/00* (2014.12); *B33Y 70/00* (2014.12)

(56) References Cited

U.S. PATENT DOCUMENTS

| | | | |
|---|---|---|---|
| 7,828,022 B2 | 11/2010 | Davidson et al. | |
| 2010/0242843 A1 | 9/2010 | Peretti et al. | |
| 2011/0300248 A1* | 12/2011 | Tung | B33Y 30/00 425/90 |
| 2016/0311164 A1* | 10/2016 | Miyano | B22F 3/105 |
| 2017/0050270 A1* | 2/2017 | Miyano | B29C 64/329 |
| 2017/0072636 A1* | 3/2017 | Ng | B22F 3/1055 |
| 2017/0157805 A1 | 6/2017 | Lind et al. | |
| 2017/0341365 A1* | 11/2017 | De Lajudie | B22F 3/1055 |
| 2018/0186073 A1* | 7/2018 | Dial | B33Y 10/00 |
| 2018/0326657 A1* | 11/2018 | Iwase | B29C 64/236 |
| 2018/0345541 A1* | 12/2018 | Cuyt | B29C 64/343 |
| 2019/0030812 A1* | 1/2019 | Branham | B01F 9/0016 |
| 2019/0060998 A1* | 2/2019 | Kelkar | B29C 64/343 |
| 2020/0061918 A1* | 2/2020 | Branham | B29C 64/255 |
| 2020/0238432 A1* | 7/2020 | Hayashi | B33Y 40/00 |

* cited by examiner

SELECTIVE POWDER DELIVERY FOR ADDITIVE MANUFACTURING

CROSS-REFERENCE TO RELATED APPLICATIONS

This application claims priority to U.S. application Ser. No. 62/570,593, filed on Oct. 10, 2017, the disclosure of which is incorporated by reference.

TECHNICAL FIELD

This specification relates to additive manufacturing, also known as 3D printing.

BACKGROUND

Additive manufacturing (AM), also known as solid freeform fabrication or 3D printing, refers to a manufacturing process where three-dimensional objects are built up from successive dispensing of raw material (e.g., powders, liquids, suspensions, or molten solids) into two-dimensional layers. In contrast, traditional machining techniques involve subtractive processes in which objects are cut out from a stock material (e.g., a block of wood, plastic or metal).

A variety of additive processes can be used in additive manufacturing. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g., stereolithography (SLA). These processes can differ in the way layers are formed to create the finished objects and in the materials that are compatible for use in the processes.

AM systems typically use an energy source for sintering or melting a powdered material. Once all the selected locations on the first layer are sintered or melted and then re-solidified, a new layer of powdered material is deposited on top of the completed layer, and the process is repeated layer by layer until the desired object is produced.

SUMMARY

A dispensing system dispenses powder in an additive manufacturing process. The dispensing system includes a powder source that contains powder to form an object. The dispensing system further includes an array of nozzles positioned at a base of the powder source. The nozzles are arranged in one or more rows that, in combination, span width of a top surface of a platen where the object is to be formed. The powder flows from the powder source through the nozzles to the top surface. A respective powder wheel in each nozzle controls flow rate of the powder through the nozzle. Each wheel has multiple troughs on surface of the wheel. When a motor rotates the wheel, the troughs transport the powder through the nozzle. Rotating speed of the wheel controls the flow rate. For solid parts of the object, the wheel rotates and allows the powder to be deposited on the top surface. For empty parts of the object, the wheel stops to prevent the powder from flowing to the surface In one aspect, a dispensing system includes a powder source, an array of nozzles, and an array of powder wheels. The dispensing system is a component of an additive manufacturing apparatus configured to form an object on a platen from powder. The powder source is configured to hold the powder to be dispensed over a top surface of the platen. The array of nozzles are coupled to the powder source. The array of nozzles are positioned in an arrangement that continuously spans at least a portion of width of the top surface. Each nozzle provides a respective path for the powder to flow from the powder source to the top surface of the platen. Each powder wheel is positioned in a respective path of a nozzle, and is connected to a respective motor. Each powder wheel has multiple troughs on surface of the wheel, the troughs configured to deliver the powder from the powder source to the top surface through the respective path when the powder wheel is rotated by the motor. For solid parts of the object, the powder wheel rotates to allow the powder to flow from the powder source to the top surface. For empty parts of the object, the powder wheel remains stationary to prevent the powder from flowing from the powder source to the top surface.

The disclosed techniques can include one or more of the following features. The powder source can be a hopper that includes a paddle wheel or agitator along width of the powder source. The paddle wheel or agitator can be configured to distribute the powder in the hopper uniformly across the nozzles. The paddle wheel or agitator can have adjustable rotation speed. The rotation speed and geometrical shape of the paddle wheel or agitator can control uniformity of distribution of the powder across the nozzles. The powder source can include a load cell configured to detect powder level in the powder source and provide the powder level to a display device or a control device.

The nozzles can be arranged in a single row or in multiple staggering rows. The nozzles can be positioned at a lower part, e.g., a base, of the powder source. The array of nozzles can be one array of multiple arrays of nozzles that are aligned along length of the top surface of the platen.

The dispensing system can include a pitch adjuster configured to adjust a pitch of the array of nozzles. Adjusting the pitch can change spatial resolution of the object. The dispensing system can include a height adjuster configured to adjust a distance between openings of the nozzles to the top surface. Like adjusting the pitch, adjusting the distance can change spatial resolution of the object.

Each powder wheel can be positioned between an inlet and an outlet of a respective nozzle. Each trough on each powder delivering wheel can be substantially parallel to an axis of the wheel. Openings of the nozzles can have various geometric shapes in various implementations. The geometric shapes can include, for example, circles, rectangles, triangles or elongated slots.

Each motor driving a powder wheel can be a stepper motor controlled by a respective stepper driver circuit. Each stepper motor can have variable rotation speed. Adjusting the rotation speed changes flow rate of the powder. For example, when the rotation speed is zero, the flow rate is zero. In general, higher rotation speed corresponds to higher flow rate. Each of the powder wheels can be coupled to a tachometer configured to detect a stall condition.

The dispensing system can include a cooling plate mounted at a base of the nozzles and powder source. The cooling plate is configured to maintain a constant operating temperature for the nozzles. The dispensing system can include a roller and blade assembly configured to level powder on the top surface of the platen using the blade and compact the powder on the top surface using the roller. The dispensing system can include an enclosure. The enclosure houses the powder source, the nozzles and the powder wheels. The enclosure can be filled with a circulating inert gas, e.g., nitrogen, helium or argon. The inert gas can exclude oxygen to below a threshold level Advantages of the foregoing may include, but are not limited to, the following. Compared to conventional powder dispensing system, the disclosed techniques are more efficient. Conventional dry powder recoating does not provide spatial selective dispensing and layering to form a uniform region on a powder bed in metal 3D printing systems. In conventional 3D printers, a pool of powders is provided in front of a blade recoater or roller prior to the spreading. A drawback of conventional recoating setup is the excessive use of powder per recoating process. The excessive use increases the chances of subjecting subsequent reclaimed powder to be exposed to spatter, metal condensate, sintering phenomenon, oxygen contamination, potential changes in crystallographic properties, etc. These effects have direct impact to flowability of powder, fusing behavior, and final part quality.

The disclosed selective powder dispensing approach, with spreading and/or compaction, allows dispensing of powder as required. The disclosed "dispense on demand" approach only dispenses powder as necessary to form the desired region of build on a powder bed.

Accordingly, the efficiency of forming an object and overall throughput of additive manufacturing can be increased. The disclosed dispensing system can include several paths through which powder can be dispensed in parallel onto a platform of the additive manufacturing apparatus. These multiple available paths can be independently controlled such that the placement of powder onto the build platform can be controlled. Accordingly, the dispensing system can dispense powder only to where powder is needed. The disclosed techniques can thus reduce or avoid wasting expensive material, e.g., metal powder, used in additive manufacturing, thus saving cost. In addition, the disclosed techniques can ensure high quality recoated layer, thus leading to more uniform powder layer thickness and compaction. The disclosed techniques can allow more predictable powder fusing under various lasing conditions, which can lead to better quality of the end product.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Additive manufacturing (AM) apparatuses can form an object by dispensing and fusing successive layers of a powder on a build platform. Control of the area on the build stage on which powder is dispensed is desirable. A controllable dispenser can permit control of the geometry of the object, or simply be used to avoid dispensing powder in areas of the build platform that will not support the object, thus reducing the consumption of powder.

The dispensing system described in this specification can include controllable and movable structures that enable the apparatus to selectively dispense the powder on the build platform, also referred to as a platen. Optionally, the dispensing system's controllable and movable structures also enable control of the powder dispensing rate, which can be selected to be low for localized and precise dispensing or can be selected to be high for high-throughput dispensing.

Additive Manufacturing Apparatuses

Figure 1A:
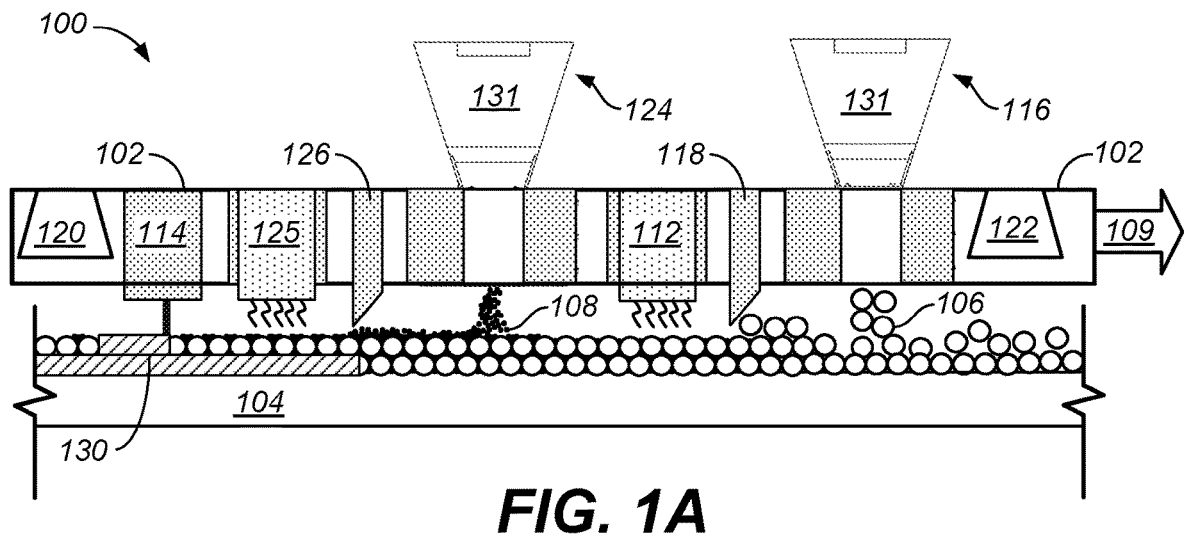
FIG. 1A is a schematic side view of an example of an additive manufacturing apparatus.

FIG. 1A shows a schematic side view of an example additive manufacturing (AM) apparatus 100 that includes a dispensing system for dispensing of powder to form an object during a build operation. The apparatus 100 includes a printhead 102 and a build platform 104 (e.g., a build stage). The printhead 102 dispenses a powder 106 and, optionally, fuses the powder 106 dispensed on the platform 104. Optionally, as described below, the printhead 102 can also dispense and/or fuse a second powder 108 on the platform 104.

Figure 1B:
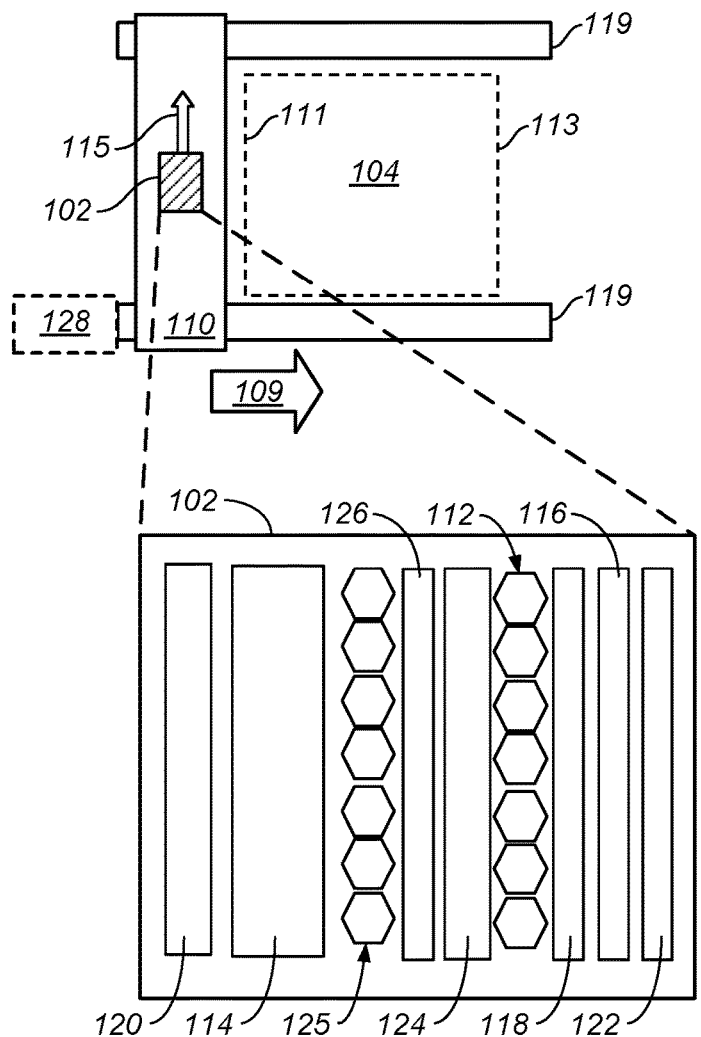
FIG. 1B is a schematic top view of the additive manufacturing apparatus of FIG. 1A.

Referring to FIGS. 1A and 1B, the printhead 102 is supported on a support 110 configured to traverse the platform 104. The support 110 can include a horizontally extending platform on which the printheads are mounted. For example, the support 110 can be driven along one or more rail 119 by a linear actuator and/or motor so as to move across the platform 104 along a first axis parallel to a forward direction 109, referred to as lengthwise. The support 110 can be a gantry supported on two opposite sides, e.g., by two rails 119, as shown in FIG. 1B. Alternatively, the support 110 can be held in a cantilever arrangement on a single rail.

In some implementations, the printhead 102 can move along the support 110 along a horizontal second axis 115 perpendicular to the first axis, referred to as widthwise. Movement along both the first and second axes enables the printhead 102 and its systems to reach different parts of the platform 104 beneath the support 110. The movement of the printhead 102 along the support 110 and the movement of the support 110 along the rails 119 provide multiple degrees of freedom of mobility for the printhead 102. The printhead 102 can move along a plane above and parallel to the build platform 104 such that the printhead 102 can be selectively positioned above a usable area of the build platform 104 (e.g., an area where the powder can be dispensed and fused).

The printhead 102 and the support 110 can cooperate to scan the usable area of the build platform 104, enabling the printhead 102 to dispense powder along the build platform 104 as needed to form the object. In the example as shown in FIG. 1B, the printhead 102 can scan in the forward direction 109 along the build platform 104. After the printhead 102 travels across the build platform 104 from a first end 111 to a second end 113 of the build platform 104 for a first time to deposit a first stripe of the layer of powder, the printhead 102 can return to the first end 111, move in a lateral direction along the horizontal second axis 115, and begin a travel across the build platform 104 again in the forward direction 109 for a second time to deposit a second stripe on the build platform 104 that is parallel to the first stripe. If the printhead 102 dispenses two or more different sizes of powder, the printhead 102 can dispense the two or more different powders during a single pass across the platform 104.

Alternatively, the support 110 can include two or more printheads that span the width of the platform 104. In this case, motion of the printhead 102 in the lateral direction along the horizontal second axis 115 may not be needed.

The printhead 102 includes at least a first dispensing system 116 to selectively dispense powder 106 on the build platform 104.

The apparatus 100 also includes an energy source 114 to selectively add energy to the layer of powder on the build platform 104. The energy source 114 can be incorporated into the printhead 102, mounted on the support 110, or be mounted separately, e.g., on a frame supporting the build platform 104 or on chamber wall that surrounds the build platform 104.

In some implementations, the energy source 114 can include a scanning laser that generates a beam of focused energy that increases a temperature of a small area of the layer of the powder. The energy source 114 can fuse the powder by using, for example, a sintering process, a melting process, or other process to cause the powder to form a solid mass of material. In some cases, the energy source 114 can include an ion beam or an electron beam.

The energy sources 114 can be positioned on the printhead 102 such that, as the printhead 102 advances in the forward direction 109, the energy sources can cover lines of powder dispensed by the dispensing system 116. When the apparatus 100 includes multiple dispensing systems, the printhead 102 can also optionally include an energy source for each of the dispensing systems. If the apparatus includes multiple heat sources, the energy sources can each be located immediately behind one of the heat sources.

Optionally, the apparatus can include a heat source 112 to direct heat to raise the temperature of the deposited powder. The heat source 112 can heat the deposited powder to a temperature that is below its sintering or melting temperature. The heat source 112 can be, for example, a heat lamp array. The energy source 114 can be incorporated into the printhead 102, mounted on the support 110, or be mounted separately, e.g., on a frame supporting the build platform 104 or on chamber wall that surrounds the build platform 104. The heat source 112 can be located, relative to the forward direction 109 of the printhead 102, behind the first dispensing system 116. As the printhead 102 moves in the forward direction 109, the heat source 112 moves across the area where the first dispensing system 116 was previously located.

In some implementations, the heat source 112 is a digitally addressable heat source in the form of an array of individually controllable light sources. The array includes, for example, vertical-cavity surface-emitting laser (VCSEL) chips, positioned above the platform 104. The array can be within the printhead 102 or be separate from the printhead 102. The array of controllable light sources can be a linear array driven by an actuator of a drive system to scan across the platform 104. In some cases, the array is a full two-dimensional array that selectively heats regions of the layer by activating a subset of the individually controllable light sources. Alternatively or in addition, the heat source includes a lamp array to simultaneously heat the entire layer of the powder. The lamp array can be part of the printhead 102 or can be an independent heat source unit that is part of the apparatus 100 but separate from the printhead 102.

In some implementations, the build platform 104 may include a heater that can heat powder dispensed on the build platform 104. The heater can be an alternative to or in addition to the heat source 112 of the printhead 102.

Optionally, the printhead 102 and/or the support 110 can also include a first spreader 118, e.g., a compacting roller or a leveling blade, that cooperates with first the dispensing system 116 to compact and spread powder dispensed by the dispensing system 116. The spreader 118 can provide the layer with a substantially uniform thickness. In some cases, the first spreader 118 can press on the layer of powder to compact the powder.

The printhead 102 and/or the support 110 can also optionally include a first sensing system 120 and/or a second sensing system 122 to detect properties of the apparatus 100 as well as powder dispensed by the dispensing system 116.

In some implementations, the printhead 102 includes a second dispensing system 124 to dispense the second powder 108. A second spreader 126 can operate with the second dispensing system 124 to spread and compact the second powder 108. The apparatus 100, e.g., the printhead 102 or the support 110, can also include a second heat source 125 that, like the first heat source 112, directs heat to powder in large areas of the build platform 104.

A controller 128 can coordinate the operations of the energy source 114, heat source 112 (if present), and dispensing system 116. The controller 128 can operate the dispensing system 116 to dispense the powder 106 and can operate the energy source 114 and the heat source 112 to fuse the powder 106 to form a workpiece 130 that becomes the object to be formed.

The controller 128 can operate the first dispensing system 116 to control, for example, the thickness and the distribution of the powder 106 dispensed on the build platform 104. The thickness of each layer depends on, for example, the number of the powder particles 106 stacked through a height of the layer or the mean diameter of the powder particles 106. In some implementations, each layer of the powder particles 106 is a single particle thick. In some cases, each layer has a thickness resulting from stacking multiple powder particles 106 on top of each other.

In some implementations, the height of the layer also depends on a distribution density of the powder particles 106, e.g., how closely packed the powder particles 106 are. A level of compaction of the powder 106 can affect the thickness of each layer dispensed. Higher levels of compaction of the powder 106 can reduce the thickness of the layer dispensed as compared to a layer formed with the same number of particles at a lower level of compaction. The higher level of compaction can further increase a uniformity of the thickness across the layer and reduce the laser residency time need to melt the layer. The thickness of each layer and the compaction of the powder can be selected to control a desired resolution for the geometry of the portion of the object being formed in that layer.

The distribution of powder dispensed for each layer, e.g., the locations of the powder within each layer, can vary based on the implementation of the additive manufacturing apparatus. In some cases, the first dispensing system 116 can selectively dispense a layer of powders across the build stage such that some portions include powder and some portions do not include powder. In some implementations, the first dispensing system 116 can dispense a uniform layer of materials on the work surface.

Dispensing Systems

Figure 2:
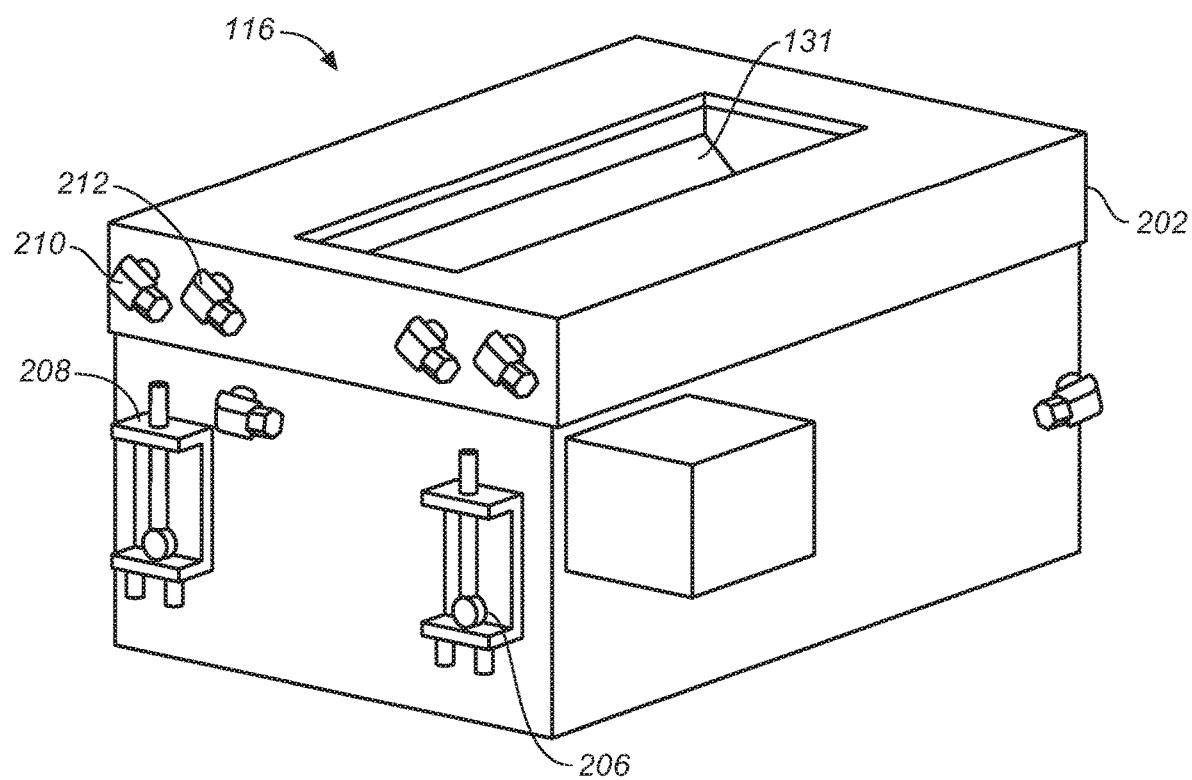
FIG. 2 illustrates an example dispensing system of the additive manufacturing apparatus.

FIG. 2 illustrates an example dispensing system of the additive manufacturing apparatus. The example dispensing system can be the dispensing system 116 (and/or, e.g., the second dispensing system 124) of FIG. 1. The dispensing system 116 includes an enclosure 202 housing various components for dispensing powder for additive manufacturing. One of the components visible in FIG. 2 is a powder source 131. In the example shown, the powder source 131 is a reservoir that may contain raw material, e.g., a powder, e.g., a metal powder, e.g., titanium powder, for additive manufacturing. The reservoir of the powder source 131 can be a hopper, e.g., tapered toward its bottom and configured to discharge its contents at the bottom, e.g., under the influence of gravity.

The dispensing system 116 can include one or more yaw and/or height adjusters 206. Each of the yaw and/or height adjusters 206 for adjusting a height of the dispensing system 116 from a top surface of a platen where the powder is to be dispensed and for leveling the dispensing system 116 relative to the top surface. For example, the dispensing system 116 can include a height adjustor 206 for each corner that is operable to adjust the height of the corner of the dispensing system 116 relative to the top surface of the platen. The height adjustors 206 can be operated individually to adjust the relative height of the corners such that the bottom of the dispenser assembly, e.g., the apertures discussed below, is parallel to the top surface of the platen.

The dispensing system 116 can include a clamp or bracket 208 that engages the support to hold the dispensing system 116 on the support. To provide yaw and/or height adjustment, the clamp or bracket or be attached to the enclosure 202 by a linear guide, e.g., a screw and guide mechanism. A control member, e.g., a knob, can be used to turn the screw so as to adjust the height of the corner of the enclosure 202. However, many other mechanisms are possible.

The dispensing system 116 can include one or more gas ports 210 for connecting to an inert gas source, e.g., a nitrogen gas cylinder or pump. During operation, the dispensing system 116 can be flushed with the inert gas, to keep oxygen level inside the enclosure 202 to a level below a threshold. The dispensing system 116 can include one or more coolant ports 212 for connecting to a coolant source, e.g., a water pump, that keeps temperature of the dispensing system 116 below a threshold temperature.

Figure 3:
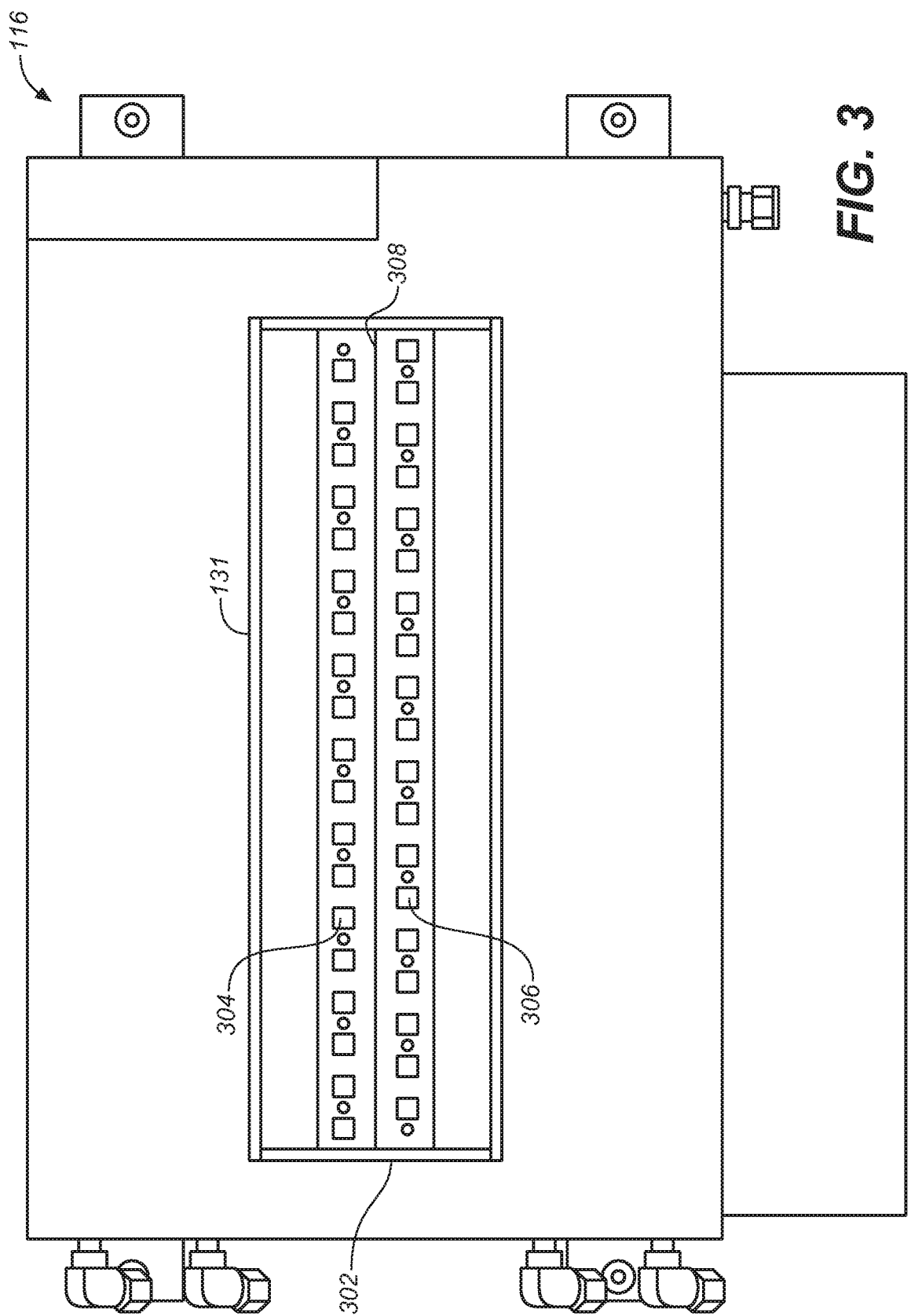
FIG. 3 is a top view of an example dispensing system.

FIG. 3 is a top view of an example dispensing system 116. In this view, top side of a nozzle array 302 at the bottom of the powder source 131 is visible. The nozzle array 302 includes multiple nozzles that allow powder to flow from the powder source 131 to a top surface of a platen where an object is to be printed from the powder. The nozzles can include, for example, nozzle 304 and nozzle 306. Inlets of the nozzle 304 and nozzle 306 are visible in FIG. 3. In the example shown, the inlets are squares, but other suitable shapes, e.g., circular, hexagonal, rectangular, etc., can be used. The inlets can 10 microns to 1 mm across. The inlets of the nozzles in the array 302 can have a uniform size.

The nozzles can be positioned in an arrangement that has one or more rows. In the example shown, the nozzles are arranged in two rows. A separator 308 can project into the reservoir to separate the rows. The nozzles in the rows are positioned in a staggered arrangement where, in combination, all the nozzles continuously cover at least a portion of the width, e.g., the entire width, of the top surface of the platen. Accordingly, when the dispensing system 116 sweeps along length of the top surface of the platen, the nozzle array 302 can sweep the entire area of the top surface.

Each nozzle in the nozzle array 302 can be individually controlled, such that when the dispensing system 116 sweeps along the length, flow of the powder can be controlled. The controlled flow allows the dispensing system 116 to dispense powder only to portions of the object to be printed that are solid.

Figure 4A:
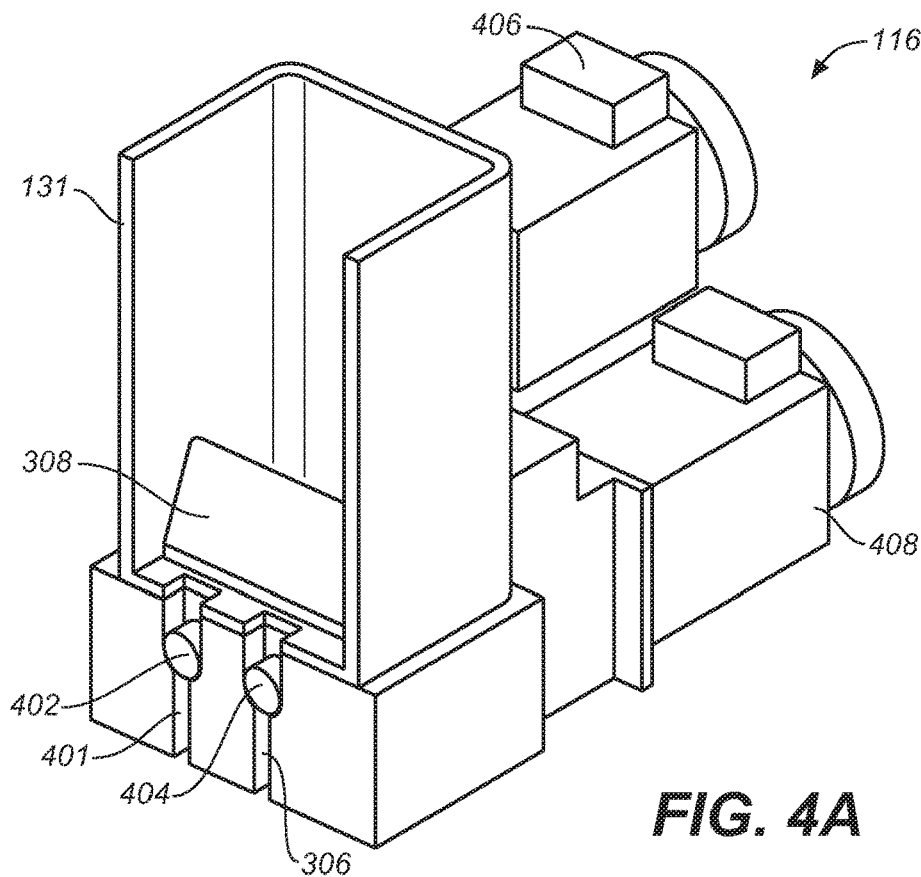
FIG. 4A is a front perspective cross-sectional view of an example hopper-wheel assembly of an example dispensing system.

FIG. 4A is a front perspective cross-sectional view of an example hopper-wheel assembly of an example dispensing system 116. As shown in FIG. 3, nozzles 401 and 306 are positioned at bottom of the powder source 131, which, in this example, is a hopper. Powder wheels 402 and 404 are positioned in the passages provided by the nozzles 401 and 306, respectively. The powder wheels 402 and 404 are coupled to motors 406 and 408, respectively. The motors 406 and 408 can be individually controllable brushless motors, e.g., stepper motors. The powder wheels 402 and 404, when rotated by the motors 406 and 408, allow powder to flow through the nozzles 401 and 306. Rotation speed of the powder wheels 402 and 404 correspond to the flow rate, where, up to a limit, higher rotation speed correspond to higher flow rate. The powder wheels 402 and 404, when not rotating, prevent powder from flowing through nozzles 401 and 306.

Figure 4B:
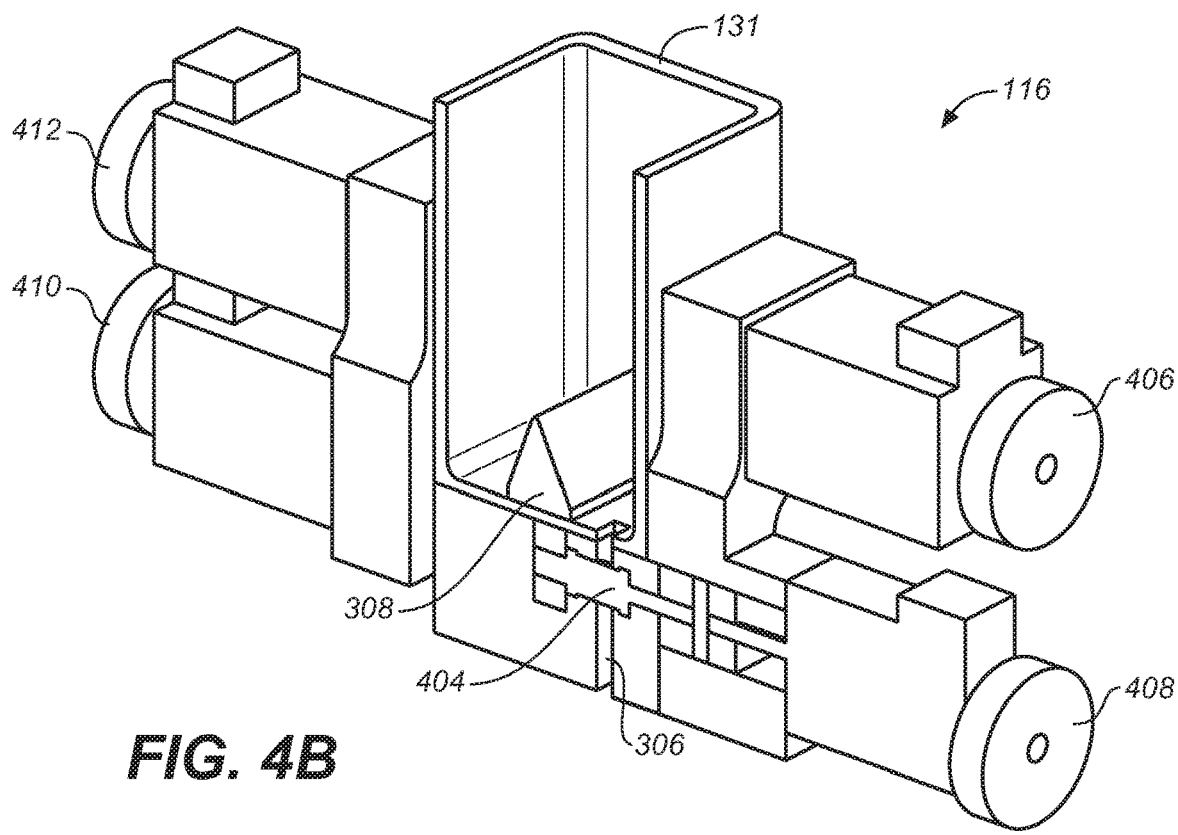
FIG. 4B is a side perspective cross-sectional view of the dispensing system of FIG. 4A.

FIG. 4B is a side perspective cross-sectional view of the dispensing system of FIG. 4A. The powder wheel 404 is driven by the motor 408. Each nozzle has a powder wheel inside the nozzle between an inlet of the nozzle and an outlet of the nozzle. Due to the proximity of nozzles in the nozzle array and the size of the motors driving the powder wheels, the motors can be stacked on top of one another in groups, e.g., pairs or triplets, rather than side-by-side with one another. In addition, motors driving different rows of nozzles may be positioned on opposite sides of the powder source 131.

In the example shown, the powder wheel 404 is driven by the motor 408 through direct drive. The powder wheel 402 (of FIG. 4A, not shown in FIG. 4B), is driven by the motor 406 through a transmission mechanism, e.g., a belt, a gear, or a worm drive. Powder wheels in another row of the nozzle array are driven in similar manner by motors 410 and 412, on opposite side of the powder source 131 from the motors 406 and 408.

Figure 5:
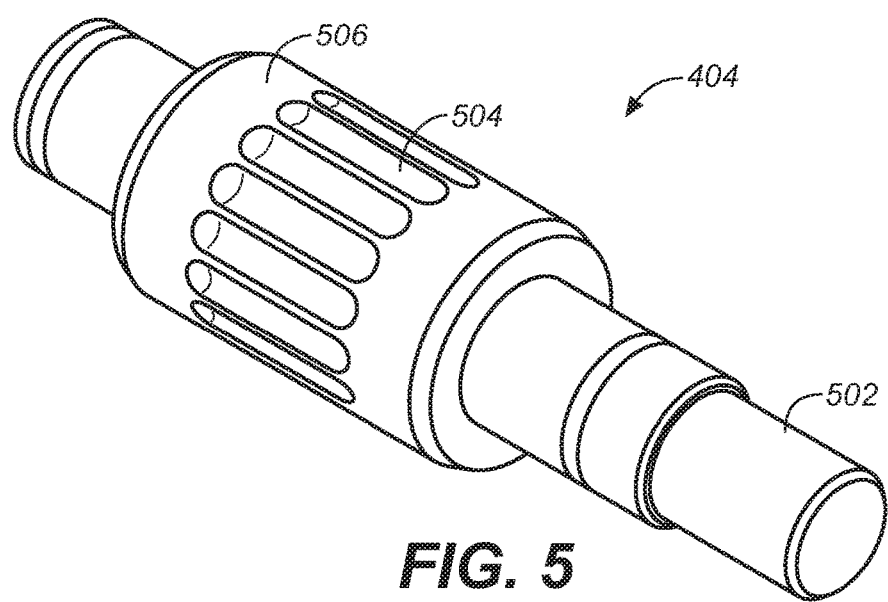
FIG. 5 illustrates an example powder wheel.

FIG. 5 illustrates an example powder wheel 404. Other powder wheels of a dispensing system, e.g., the powder wheel 402 of FIG. 4A and powder wheel 602 of FIG. 6, can have a similar structure.

The powder wheel 404 can have an axle 502 that is coupled to a driving motor. The powder wheel 404 can rotate round the axis of the axle 502. The active portion of the powder wheel 404, i.e., the portion that will contact the powder, can include a cylindrical surface 506 have one or more troughs 504. The cylindrical surface 506 can have a larger diameter than the axle 502. Each trough 504 can be substantially in parallel to the axle 502. The length of each trough 504 can correspond to a width or diameter of a nozzle, e.g., the nozzle 306 of FIG. 3. The width of each trough 504 can be selected based on the size of the powder to be dispensed, such that at least one powder particle can fit into the width of the trough 504. Likewise, the depth of each trough 504 can be selected based on the powder to be dispensed, such that at least one powder particle can fit into the depth of the trough 504 without protruding from the surface 506 of the powder wheel 404. Spacing between troughs can correspond to desired spatial resolution of the printing and speed of the driving motor.

Figure 5A:
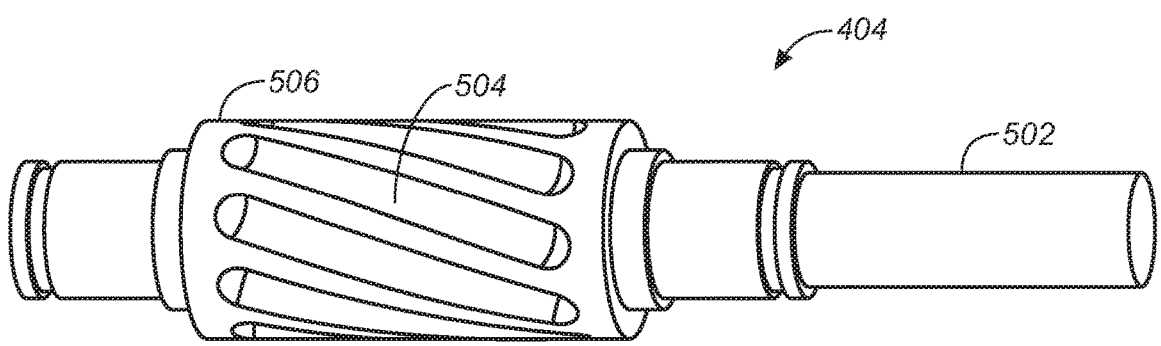
FIGS. 5A and 5B illustrate alternative powder wheels.
Figure 5B:
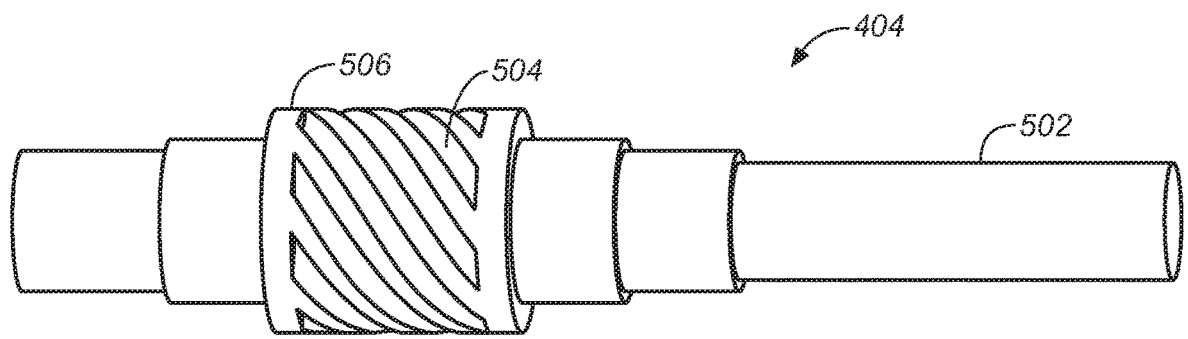

As noted above, FIG. 5 illustrates the troughs 504 extending in parallel to the axis of rotation, and thus parallel to the axle 502. However, as shown in FIGS. 5A and 5B, the troughs 504 could be formed in the cylindrical surface 506 at an angle to the axis of rotation to form a partial or full spiral around the axis of rotation. The angle in the plane tangent to the cylindrical surface 506 between an axis parallel to the axis of rotation and trough can be between 15 and 45°. When the powder wheel 404 rotates, powder will shift, e.g., under gravity, into the troughs 504. The one or more troughs 504 can transport the powder through a the gap between the cylindrical surface 506 and the side walls of nozzle. Thus, rotation of the powder wheel 404 will cause the powder to flow from an inlet of a nozzle to an outlet of the nozzle, thus from the powder source to the top surface of the platen. In general, the faster the rotation, the higher the flow rate. When the powder wheel 404 is stationary, the powder wheel 404 blocks passage of the powder. Accordingly, controlling rotation speed of the powder wheel 404 controls flow rate of the powder.

For solid parts of the object, the powder wheel rotates to allow the powder to flow from the powder source to the top surface. For empty parts of the object, the powder wheel remains stationary to prevent the powder from flowing from the powder source to the top surface.

Figure 6:
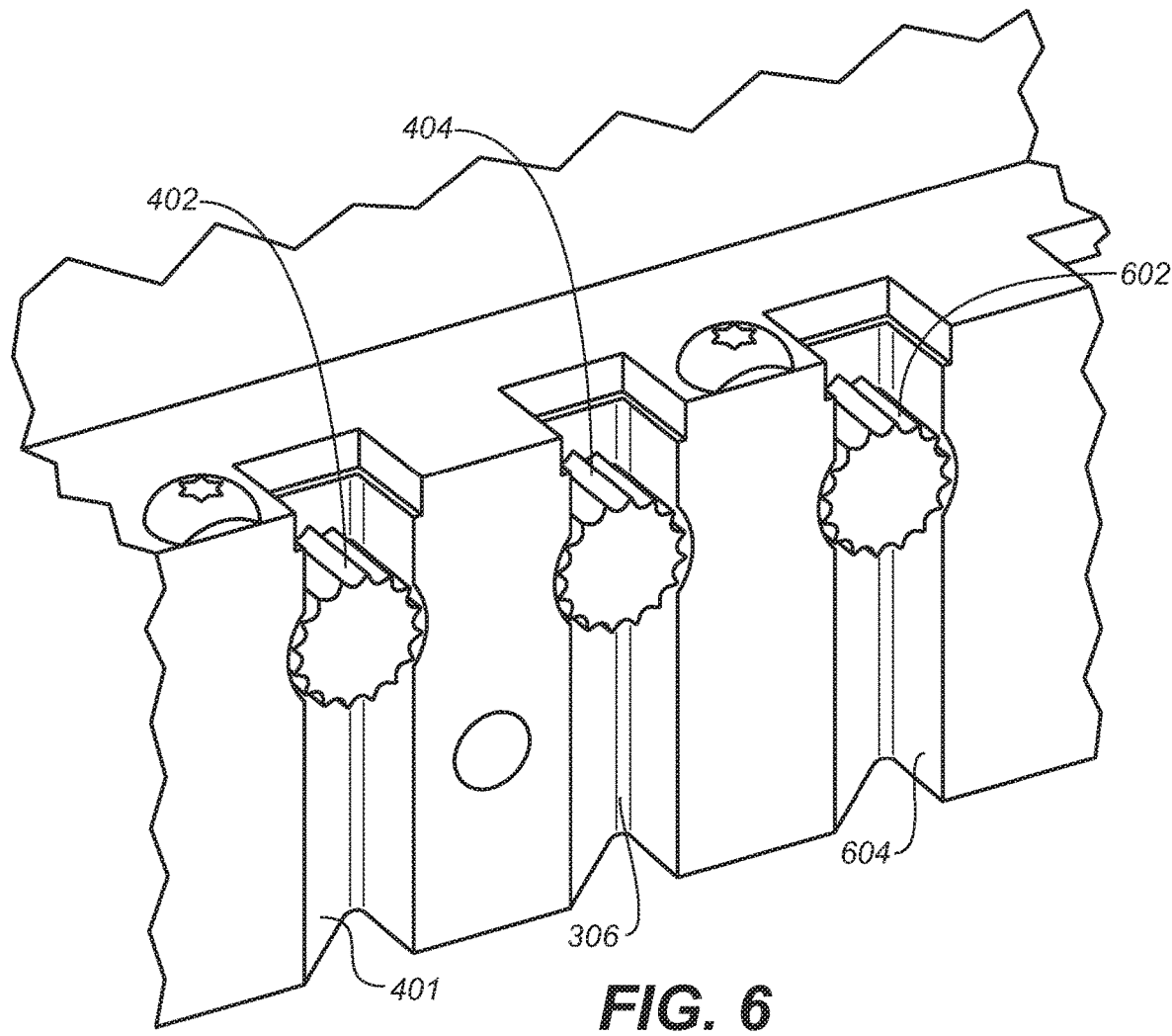
FIG. 6 illustrates an example arrangement of powder wheels in nozzles.

FIG. 6 illustrates an example arrangement of powder wheels in nozzles. Powder wheels 402, 404 and 602 are placed in nozzles 401, 306 and 604, respectively. Diameters of the powder wheels 402, 404 and 602 corresponds to widths or diameters of the nozzles 401, 306 and 604. In the example shown, the powder wheels 402, 404 and 602 are placed between inlets of the nozzles 401, 306 and 604 at the top and outlets of the nozzles 401, 306 and 604 at the bottom. When the powder wheels 402, 404 and 602 are not rotating, the powder wheels 402, 404 and 602 blocks the paths in the nozzles 401, 306 and 604 such that powder cannot flow from the inlets to the outlets. When the nozzles 401, 306 and 604 rotate, the powder can be transported from the inlets to the outlets by the troughs.

In the example shown, the inlets and outlets are squares. In various implementations, the inlets and outlets can have various geometric shapes, e.g., squares, rectangles, circles, ovals, elongates slots, etc. Space tolerance between the powder wheels 402, 404 and 602 and walls of their respective nozzles 401, 306 and 604 is configured to be smaller than diameter of powder particles. Accordingly, powder can move from the inlets to outlets only in the troughs and only when the powder wheels 402, 404 and 602 are rotating. The limit in space tolerance prevents powder from leaking through space between the powder wheels 402, 404 and 602 and the walls.

Figure 7:
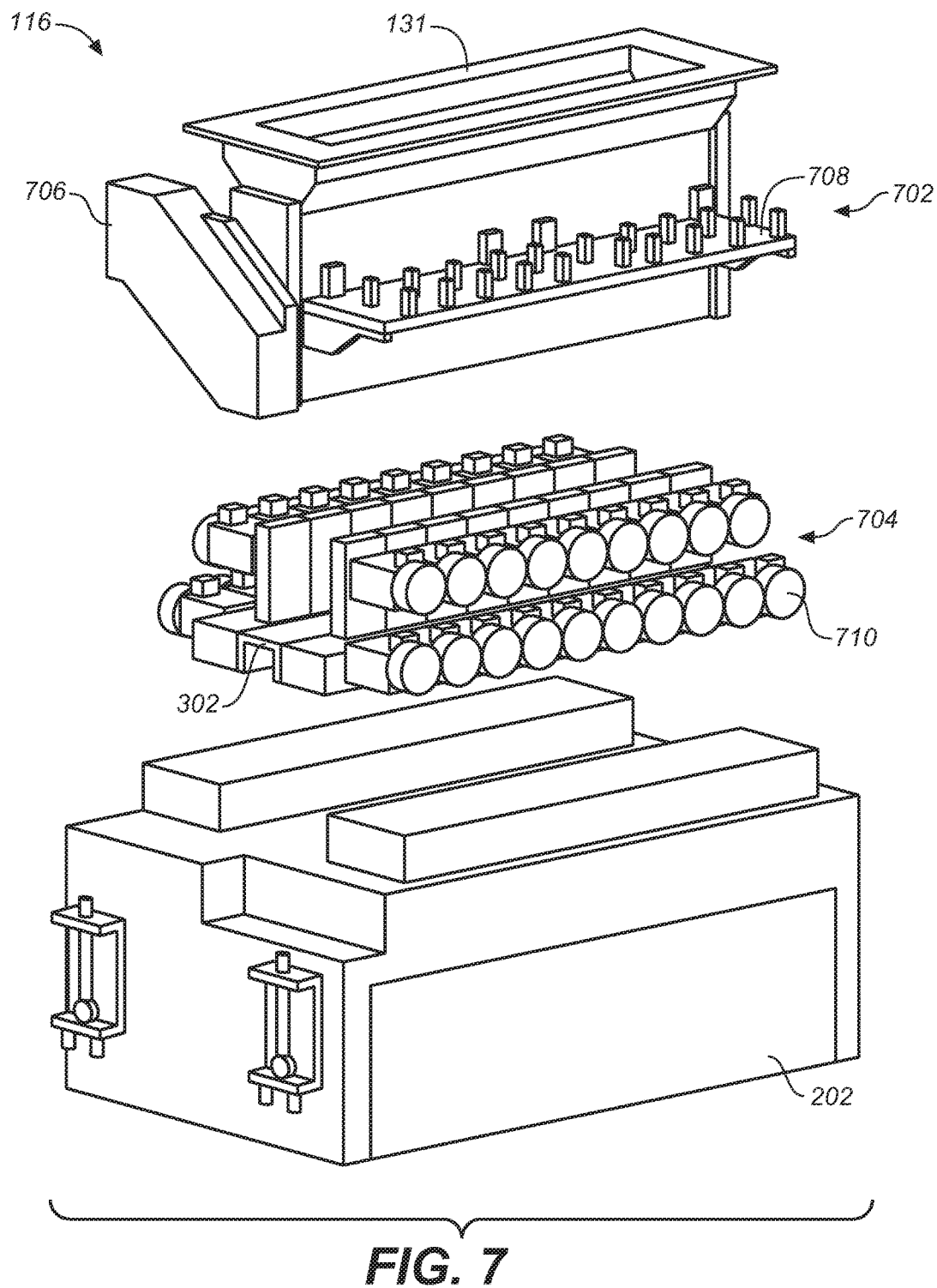
FIG. 7 illustrates components of an example dispensing system.

FIG. 7 illustrates components of an example dispensing system 116. The dispensing system 116 includes a powder source assembly 702, a nozzle assembly 704, and an enclosure 202. The powder source assembly 702 includes a powder source 131, an agitator unit 706, and a control and powder distribution circuit 708.

The nozzle assembly 704 is mounted at a base of the powder source assembly 702. The nozzle assembly 704 includes a nozzle array 302, powder wheels (not shown) in the nozzles of the nozzle array 302, and banks of motors 710 for driving the powder wheels. The powder source assembly 702, with the nozzle assembly 704 mounted at the base, is housed in the enclosure 202.

Figure 8:
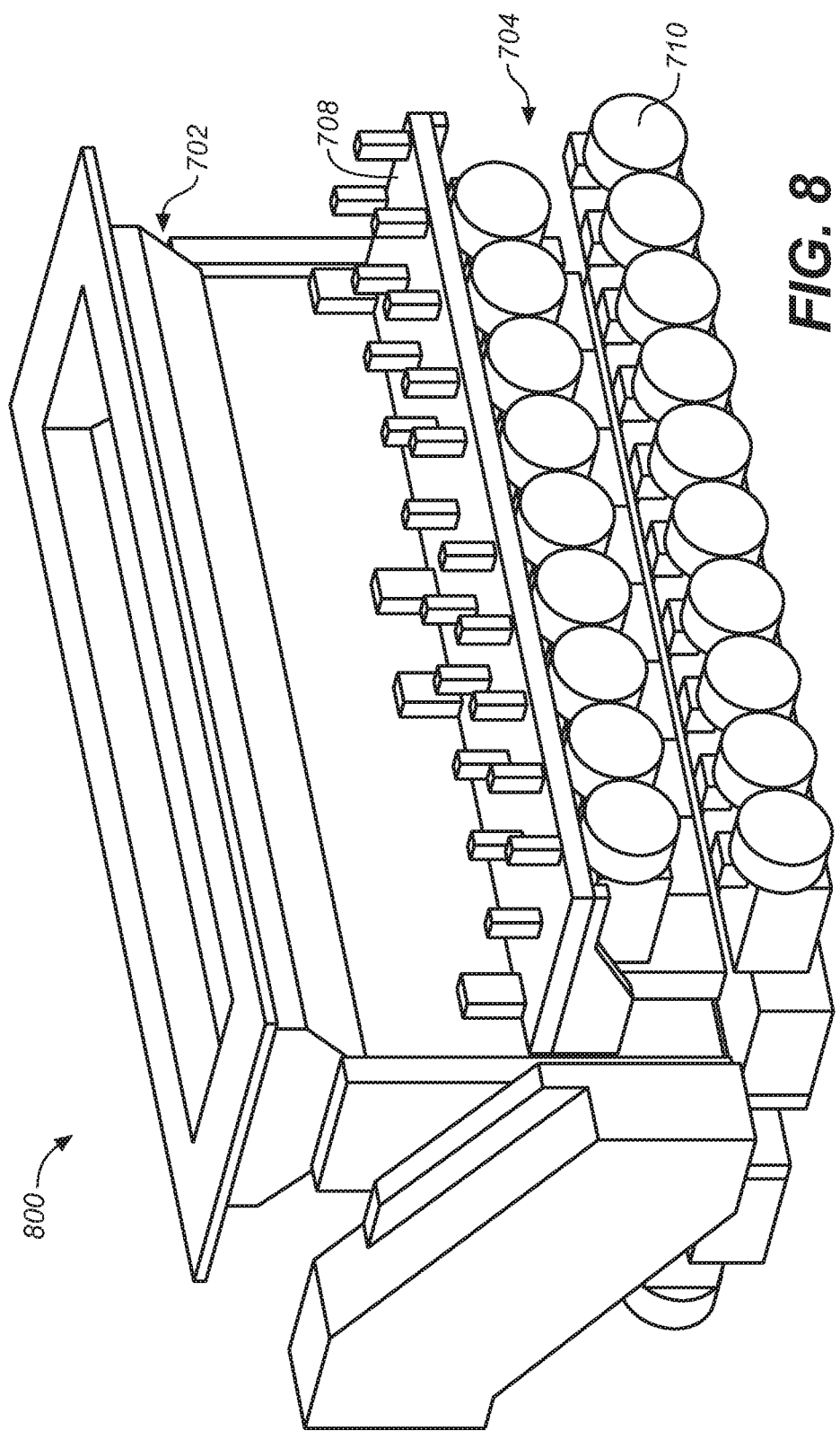
FIG. 8 illustrates an example assembly integrating a powder source and a nozzle array.

FIG. 8 illustrates an example assembly 800 integrating a powder source and a nozzle array. The nozzle assembly 704 is mounted at the base of the powder source assembly 702. The banks of motors 710 is coupled to the control and powder distribution circuit 708, where the control and powder distribution circuit 708 provides power to the motors and individually controls rotation of each motor. In some implementations, the control and powder distribution circuit 708 includes sensors configured to detect stalling of the powder wheels. For example, each powder wheel can be coupled to a tachometer. The tachometer can measure the rotation speed, e.g., in rpm. If a powder wheel is stalled (e.g., either a complete stall or a speed reduction), e.g., due to uneven size or clump in the powder, a corresponding sensor can detect the stall. The control and powder distribution circuit 708 can submit information of the stall to a control device to stop printing, or to a display device notifying a user of an anomaly. Alternatively or in addition, the system can increase the rotation rate of adjacent powder wheels to increase powder delivery in immediately adjacent regions to compensate for the reduced powder delivery from the stalled powder wheel.

Figure 9A:
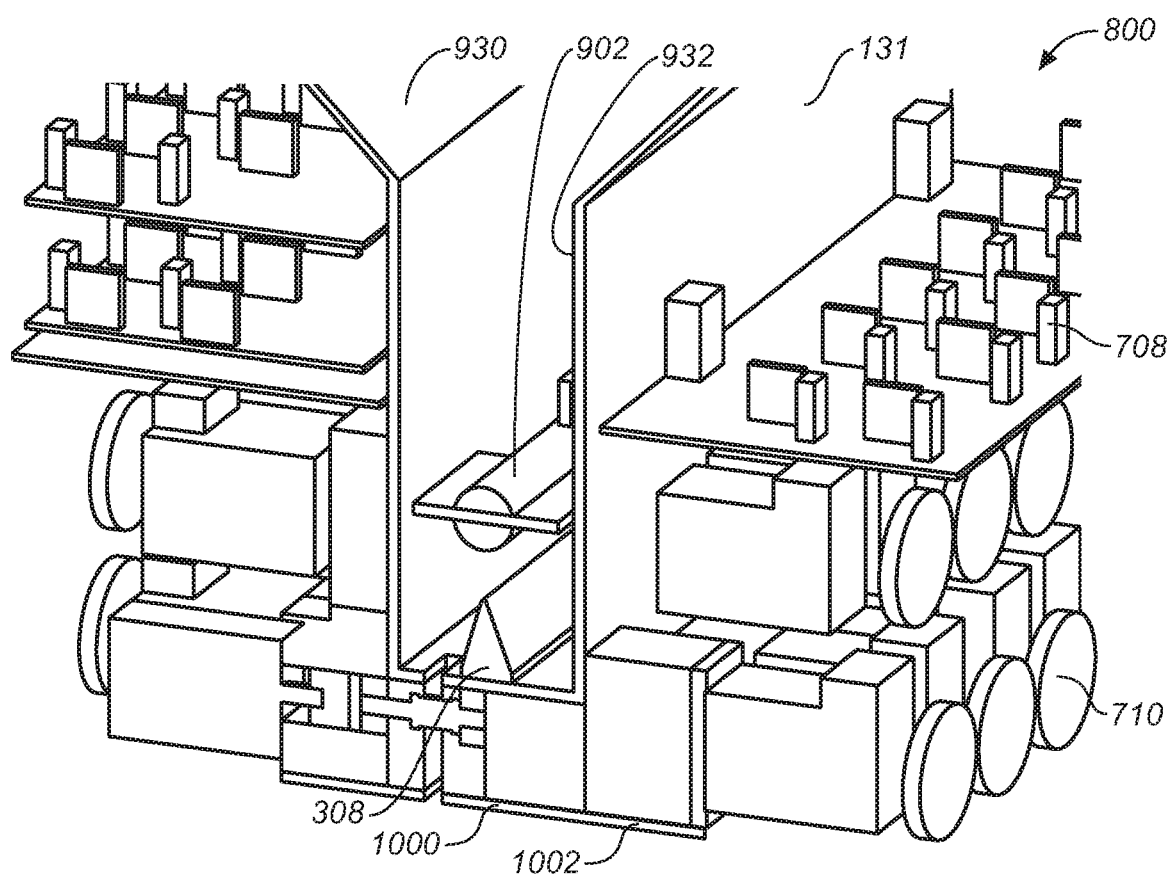
FIG. 9A is a cross-section view of an example powder source assembly.

FIG. 9A is a cross-section view of an example powder source assembly 800. The powder source assembly 800 can provide at least a portion of the dispensing system 116. From the side, the powder source 131, e.g., a hopper, can have a shape like a funnel, where walls of the funnel guide powder downwards toward the nozzle array. In particular, the powder source can include an upper portion 930 that provides the narrowing portion of the funnel and a lower portion 932 of uniform width.

A separator 308, having a triangular shape from the side, runs across width of the powder source 131. The separator 308 is mounted at the base of the powder source 131 and projects upwardly into the lower portion 932 of the hopper. The separator can guide powder to split between rows of nozzles. The separator 308 can have a triangular cross-section.

The control and powder distribution circuit 708 and the banks of motors 710 are located on either side of the neck of the funnel, and are aligned width-wise with the powder source 131.

The powder source 131 can have an agitator 902. The agitator 902 can be a paddle wheel or augur screw that oscillates (e.g., rotates back and forth about the long axis) to maintain the flowability of the powder. The agitator 902 can be located inside the neck portion of the funnel and run along the width of the powder source 131. The agitator 902 helps the powder spread evenly along width of the powder source 131, and evenly between sides of the separator 308, such that flow of the powder through the active nozzles is not impeded.

Figure 9B:
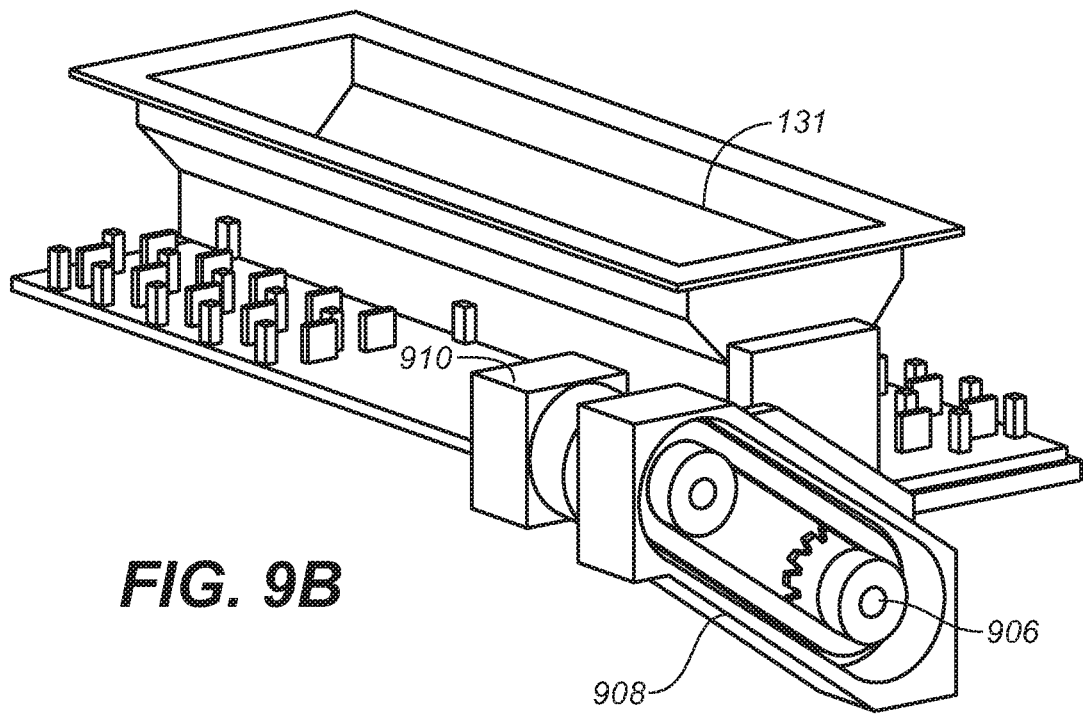
FIGS. 9B and 9C illustrate an example paddle wheel, gear box and drive mechanism.
Figure 9C:
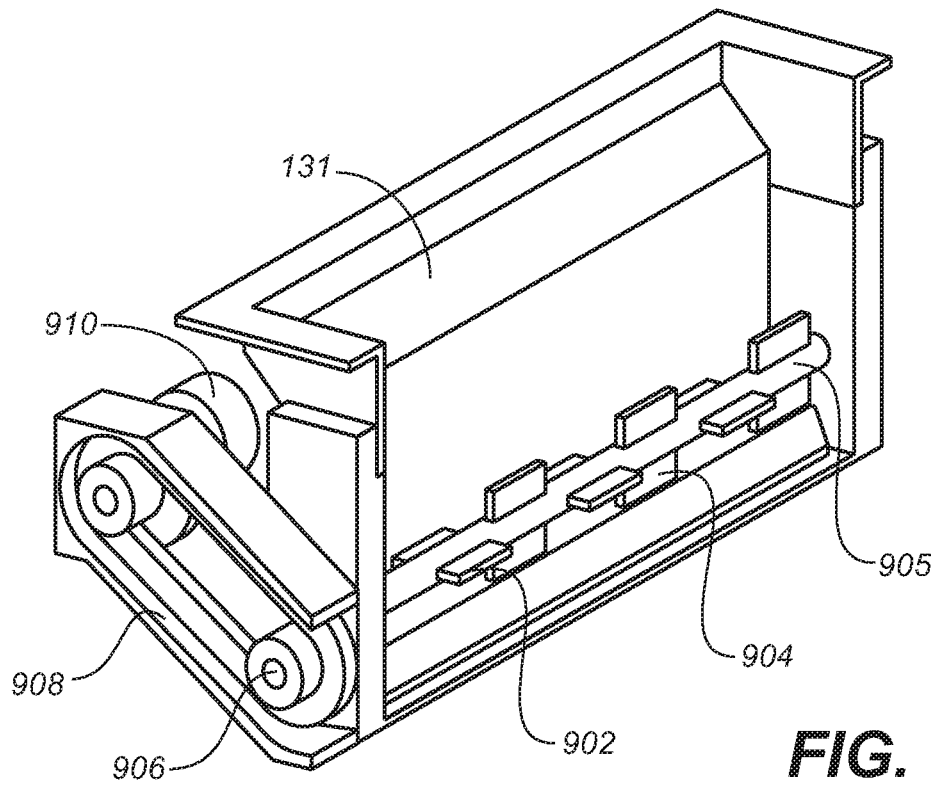

FIG. 9B illustrates an example paddle wheel, gear box and drive mechanism. The paddle wheel, gear box and drive mechanism can be mounted on the powder source 131. As shown in FIG. 9C, a agitator 902 runs across width of the powder source 131. As a paddle wheel, the agitator 902 has one or more paddles 904 that project outwardly from an rotatable axle 905. This stirs powder in the powder source 131 so that powder is distributed evenly to the nozzles.

The agitator 902 is coupled to a gearbox 908. The gearbox 908 includes one or more gears 906, belts, worm drives, or other driving mechanism configured to rotate the agitator 902. An agitator motor 910 powers the agitator 902 through the gearbox 908.

Returning to FIG. 9A, a cooling plate 1000 can be mounted at the base of the assembly 800, or at the base of the enclosure 202. In the example shown, the cooling plate 1000 is mounted on the bottom surface of the assembly 800. The cooling plate 1000 includes a heat exchange element 1002. The heat exchange element 1002 can include an air or liquid cooled tube that carries heat away from the dispensing system. In the example shown, the heat exchange element 1002 is a water-cooled heat conducting tube winding through the nozzle array. The cooling plate 1000 assists in protecting the dispensing system from heat from the powder bed or the working part. Alternatively or in addition, the assembly 800 can include a heat shield to protect the dispensing system.

Figure 10A:
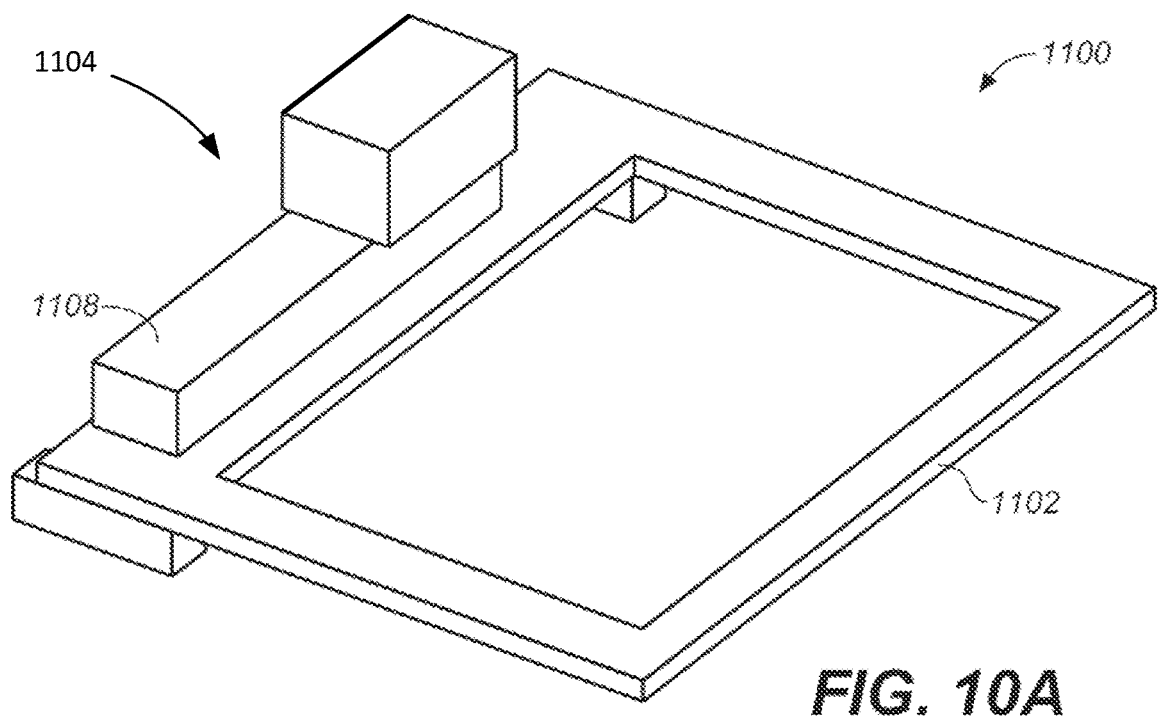
FIG. 10A is a top view of an example roller and blade assembly.

FIG. 10A is a top view of an example roller and blade assembly 1100. The roller and blade assembly 1100 can be mounted at the base of the dispensing system 116 of FIG. 2.

The roller and blade assembly 1100 can include a carriage 1102. Mounted on top of the carriage 1102 is a leveling blade mechanism 1104 housing and controlling a leveling blade 1106. The blade 1106 can provide the spreader 118 or 126 (see FIG. 1A). In addition, a compaction roller assembly 1108 is mounted on top of the carriage 1102. The compaction roller assembly 1108 is configured to house and control a compaction roller 1110.

Figure 10B:
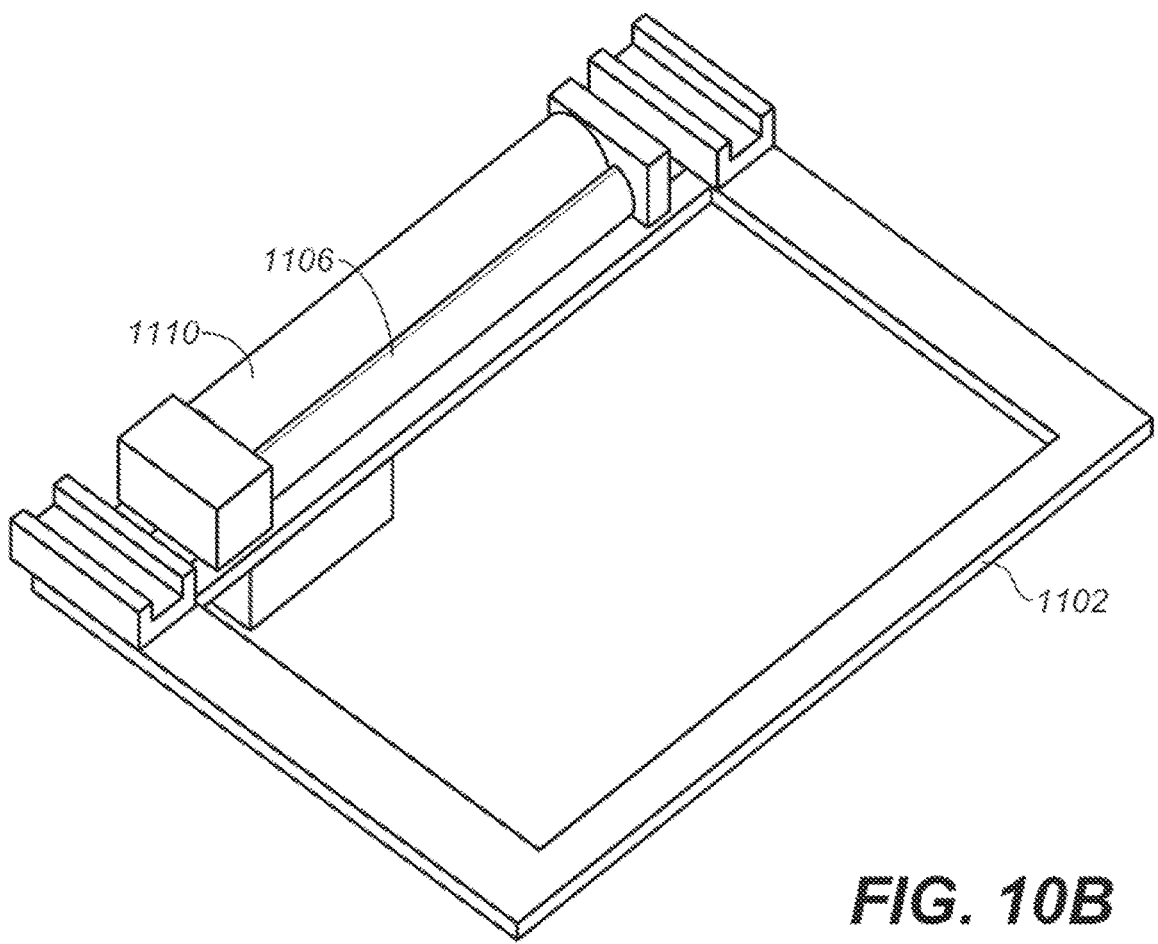
FIG. 10B is a bottom view of an example roller and blade assembly.

FIG. 10B is a bottom view of an example roller and blade assembly. The leveling blade 1106 and compaction roller 1110 are visible in FIG. 10B. Each of the leveling blade 1106 and compaction roller 1110 can perform the operations of the spreader 118 of FIG. 1A.

Operations of the Dispensing Systems

Figure 11:
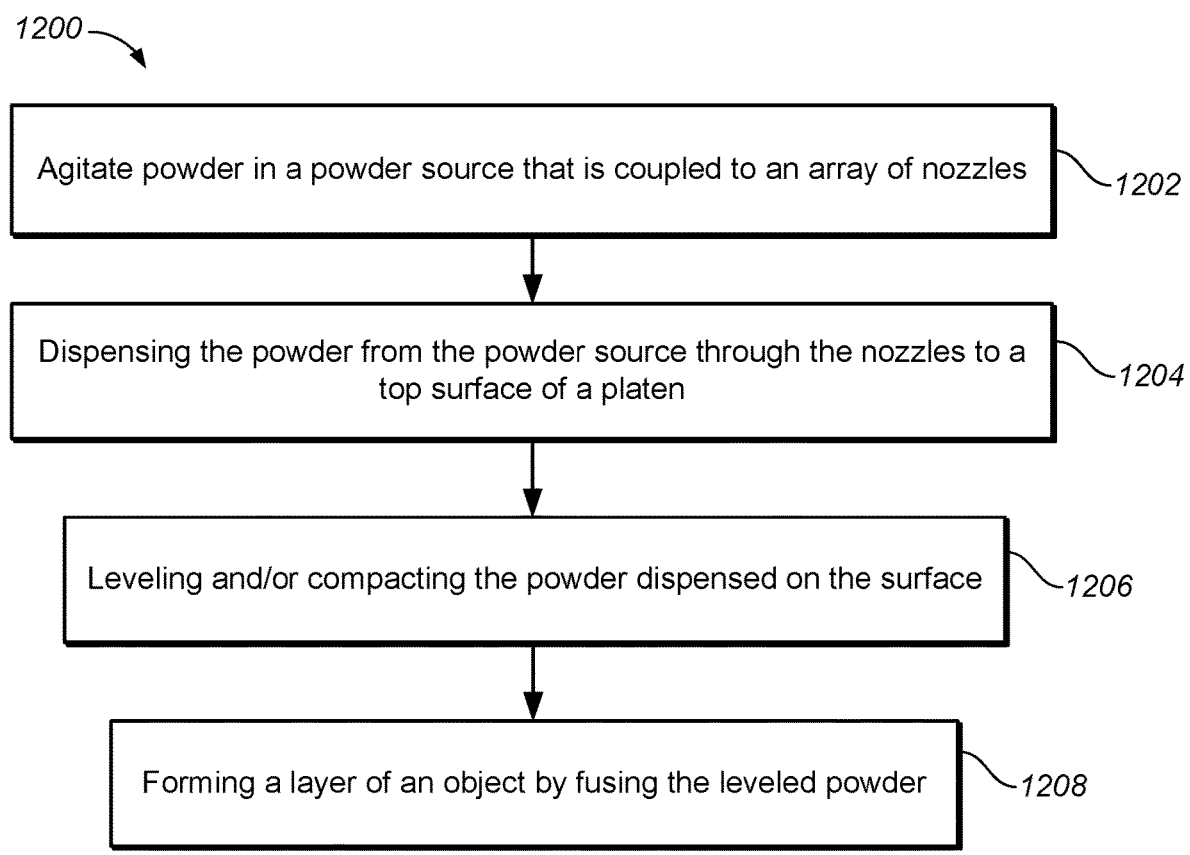
FIG. 11 is a flowchart of an example process of additive manufacturing using selective powder delivery.

The dispensing systems described herein facilitate dispensing and compaction of powder onto the build platform of the apparatus. FIG. 11 is a flowchart of an example process 1200 of additive manufacturing using selective powder delivery. The process 1200 can be performed by an AM apparatus including dispensing system, e.g., the apparatus 100 including the dispensing system 116 of FIGS. 1A and 1B.

A powder source of a powder dispensing system, e.g., a hopper, receives powder for printing an object. An agitator in the powder source agitates the powder (1202) to maintain the powder in a flowable state. This permits the powder to distribute uniformly across an array of nozzles. The array of nozzles are coupled to the powder source at the base of the powder source. The nozzles are positioned in an arrangement, e.g., in one or more rows. In combination, the nozzles continuously span at least a portion of width of a top surface of a platen on which the object is to be printed.

The nozzles dispense (1204) the powder from the powder source to the top surface. During dispensing, a respective powder wheel in each nozzle controls a respective flow rate of the powder for the nozzle. The apparatus forms the layer by moving the dispensing system across length of the top surface of the platen.

Each powder wheel can have multiple troughs on surface of the wheel for transporting the powder when the wheel rotates. Each powder wheel is coupled to a respective motor. Rotating speed and geometric shape of troughs of each powder wheel control the respective flow rate. For example, rotating a powder wheel allows the powder to flow from the powder source to the top surface where a portion of the object requires comprises solid material. A stationary a powder wheel that does not rotate can prevent the powder from flowing from the powder source to the top surface where the object is not being fabricated.

A cooling plate can be mounted on the dispensing system to cools the dispensing system.

Optionally, a spreader, e.g., a blade, a roller or both, levels and/or compacts (1206) the powder dispensed on the top surface.

The apparatus forms a layer of the object by fusing the leveled powder (1208). For example, an energy beam, e.g., a laser beam, with controllable intensity can be scanned across the layer of powder to selectively fuse portions of the powder corresponding to solid regions of the object being fabricated.

In some implementations, the apparatus has multiple dispensing systems. Each of the dispensing systems can dispense a different powder. At least one powder can be a metal powder.

More generally, referring to FIG. 1A, 1B, the controller 128 can operate the apparatus 100, and in particular, the dispensing system 116 to control the dispensing and compacting operations. The controller 128 can receive signals from, for example, user input on a user interface of the apparatus or sensing signals from sensors of the apparatus 100. The user input can provide CAD data indicative of the object to be formed. The controller 128 can use that CAD data to determine properties of the structures formed during additive manufacturing processes. Based on the CAD data, the controller 128 can generate instructions usable by each of the systems operable with the controller 128, for example, to dispense the powder, to fuse the powder, to move various systems of the apparatus 100, and to sense properties of the systems, powder, and/or the workpiece 130.

In an example process of dispensing and compacting the powder, powder particles are first loaded through the powder source 131 of FIG. 2. The powder source 131 can be a hopper serving as a reservoir for the powder. The powder particles travel through the powder source 131 toward an array of nozzles. Powder wheels in the array of nozzles controls where on the top surface of the platen the powder is dispensed.

The controller can control the level of compaction, the location of powder dispensing, and the rate of powder dispensing based on the desired levels for each of those parameters included in the CAD data. In this regard, the controller can control the powder wheels, e.g., the powder wheels 402, 404 and 602 of FIG. 6, to achieve these desired parameters. Furthermore, the controller can use the CAD data, which can specify the geometry of the object to be formed, to control where the powder is to be dispensed. While the controller can control a position of the dispensing system above the build platform to control where the powder is dispensed, the controller can also control where along the dispensing system the powder is dispensed.

Referring to FIGS. 1A and 1B, the controller can control other systems to perform operations to form the object. These systems include the printhead 102, the heat source 112, and the energy source 114 to fuse the powder dispensed by the dispensing system 116. After the dispensing system 116 has dispensed a layer of the powder, the controller can control the heat source 112 and the energy source 114 to cooperate to heat and fuse the powder within the layer. The controller can then control the dispensing system 116 to dispense another layer of the powder.

Controllers and computing devices can implement these operations and other processes and operations described herein. As described above, the controller 128 of the apparatus 100 can include one or more processing devices connected to the various components of the apparatus 100, e.g., actuators, valves, and voltage sources, to generate control signals for those components. The controller can coordinate the operation and cause the apparatus 100 to carry out the various functional operations or sequence of steps described above. The controller can control the movement and operations of the systems of the printhead 102. The controller 128, for example, controls the location of feed material, including the first and second powder particles. The controller 128 also controls the intensity of the energy source based on the number of layers in a group of layers to be fused at once. The controller 128 also controls the location where energy is added by, for example, moving the energy source or the printhead.

The controller 128 and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

The controller 128 and other computing devices part of systems described can include non-transitory computer readable medium to store a data object, e.g., a computer aided design (CAD)-compatible file that identifies the pattern in which the feed material should be deposited for each layer. For example, the data object could be a STL-formatted file, a 3D Manufacturing Format (3MF) file, or an Additive Manufacturing File Format (AMF) file. For example, the controller could receive the data object from a remote computer. A processor in the controller 128, e.g., as controlled by firmware or software, can interpret the data object received from the computer to generate the set of signals necessary to control the components of the apparatus 100 to fuse the specified pattern for each layer.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The printhead of FIG. 1A includes several systems that enable the apparatus 100 to build objects. In some cases, instead of a printhead, an AM apparatus includes independently operated systems, including independently operated energy sources, dispensers, and sensors. Each of these systems can be independently moved and may or may not be part of a modular printhead. In some examples, the printhead includes only the dispensers, and the apparatus include separate energy sources to perform the fusing operations. The printhead in these examples would therefore cooperate with the controller to perform the dispensing operations.

While the operations are described to include a single size of powder particles, in some implementations, these operations can be implemented with multiple different sizes of powder particles. While some implementations of the AM apparatus described herein include two types of particles (e.g., the first and the second powder particles), in some cases, additional types of particles can be used. As described above, the first powder particles have a larger size than the second powder particles. In some implementations, prior to dispensing the second powder particles to form a layer, the apparatus dispenses third powder particles onto the platen or underlying previously dispensed layer.

The processing conditions for additive manufacturing of metals and ceramics are significantly different than those for plastics. For example, in general, metals and ceramics require significantly higher processing temperatures. Thus 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK) and polystyrene.

A number of implementations have been described. Nevertheless, it will be understood that various modifications may be made. For example,

- Various components described above as being part of the printhead, such as the dispensing system(s), spreader (s), sensing system(s), heat source and/or energy source, can be mounted on the gantry instead of in the printhead, or be mounted on the frame that supports the gantry.
- The dispensing system(s) can each include more than two rows of nozzles arranged in a staggered configuration.
- The powder source can have different shapes and sizes in different implementations. The powder source can be a funnel shaped round container. In some implementations, the powder source can include a tube supplying powder to rows of nozzles.
- Continuous span across the width can be achieved in part by the spreading of the powder on the top surface after the powder leaves the nozzles. Accordingly, nozzles may or may not be immediately aligned one next to another.

Accordingly, other implementations are within the scope of the claims.

What is claimed is:
1. A dispensing system comprising:
   a powder source configured to store powder to be dispensed over a top surface of a platen;
   an array of nozzles coupled to the powder source, the array of nozzles positioned in an arrangement that, in combination, continuously spans at least a portion of width of the top surface, each nozzle providing a respective path for the powder to flow from the powder source to the top surface of the platen; and
   an array of powder wheels, each powder wheel being positioned in a respective path of a nozzle and being connected to a respective motor, each powder wheel having a plurality of troughs on surface of the powder wheel, the troughs configured to deliver the powder from the powder source to the top surface through the respective path when the powder wheel is rotated by the motor, wherein the dispensing system is a component of an additive manufacturing apparatus configured to form an object from the powder on the platen.

2. The dispensing system of claim 1, wherein powder source is a hopper that includes a paddle wheel or agitator along width of the powder source, the paddle wheel or agitator configured to distribute the powder uniformly across the nozzles.

3. The dispensing system of claim 2, wherein the paddle wheel or agitator has adjustable rotation speed.

4. The dispensing system of claim 1, wherein the powder source includes a load cell configured to detect powder level in the powder source and provide the powder level to a display device or a control device.

5. The dispensing system of claim 1, wherein the nozzles are arranged in a single row or a plurality of staggering rows, the nozzles being positioned at base of the powder source.

6. The dispensing system of claim 1, wherein the array of nozzles is one array of a plurality of arrays of nozzles that are aligned along length of the top surface of the platen.

7. The dispensing system of claim 1, comprising a pitch adjuster configured to adjust a pitch of the array of nozzles.

8. The dispensing system of claim 1, comprising a height adjuster configured to adjust a distance between openings of the nozzles to the top surface.

9. The dispensing system of claim 1, wherein:
each trough on each powder delivering wheel is parallel to an axis of the wheel, and
openings of the nozzles are circles, rectangles, triangles or elongated slots.

10. The dispensing system of claim 1, wherein each powder wheel is positioned between an inlet and an outlet of a respective nozzle.

11. The dispensing system of claim 1, wherein each motor is a stepper motor driven by a respective stepper driver circuit, each stepper motor having variable rotation speed, wherein adjusting the rotation speed changes a flow rate of the powder.

12. The dispensing system of claim 1, wherein each of the powder wheels is coupled to a tachometer configured to detect a stall condition.

13. The dispensing system of claim 1, comprising a cooling plate mounted on a base of the nozzles and powder source, the cooling plate configured to maintain a constant operating temperature.

14. The dispensing system of claim 1, comprising a roller and blade assembly configured to level powder on the top surface of the platen using the blade assembly and compact the powder on the top surface using the roller.

15. The dispensing system of claim 1, comprising an enclosure housing the powder source, the nozzles and the powder wheels, the enclosure configured to be filled with a circulating inert gas, the inert gas excluding oxygen to below a threshold level.

16. A method of dispensing powder in an additive manufacturing apparatus, the method comprising:
distributing powder uniformly in a powder source of a powder dispensing system across an array of nozzles coupled to the powder source, the nozzles being positioned in an arrangement that continuously spans at least a portion of width of a top surface of a platen;
dispensing the powder from the powder source through the nozzles to the top surface, the dispensing including controlling a respective flow rate of the powder through each of the nozzles by a respective powder wheel, wherein each powder wheel is positioned between an inlet and an outlet of a respective nozzle, each powder wheel has a plurality of troughs on surface of the powder wheel, and each powder wheel is coupled to a respective motor;
leveling the powder dispensed on the top surface; and
forming a layer of an object by fusing the leveled powder, wherein forming the layer includes moving the dispensing system across a length of the top surface of the platen.

17. The method of claim 16, wherein dispensing the powder comprises:
rotating a powder wheel to allow the powder to flow from the powder source to the top surface where a portion of the object is solid material; and
stopping a powder wheel to prevent the powder from flowing from the powder source to the top surface where a portion of the object is empty space.

18. The method of claim 16, comprising controlling spatial resolution of the object by adjusting a pitch of the dispensing system.

19. The method of claim 16, comprising cooling the dispensing system by a cooling plate mounted on base of the dispensing system.

20. The method of claim 16, wherein the dispensing system is one among a plurality of dispensing systems of the additive manufacturing apparatus, each of the dispensing systems dispensing a different powder, at least one powder being a metal powder.

\* \* \* \* \*